United States Patent [19]

Keysell et al.

[11] Patent Number: 4,502,416

[45] Date of Patent: Mar. 5, 1985

[54] AUTOMATIC ANIMAL FEEDER

[75] Inventors: F. Kerry Keysell, Sherborne; Robert G. Lawrence, Bideford, both of England

[73] Assignee: Quantock Veal Limited, Dorset, England

[21] Appl. No.: 396,097

[22] Filed: Jul. 7, 1982

[51] Int. Cl.³ .............................................. A01K 5/00
[52] U.S. Cl. ............................ 119/51.11; 137/624.11; 222/129.4; 222/135; 222/154; 366/145; 366/153; 366/160; 366/601; 366/603
[58] Field of Search ............... 222/638–644, 222/650, 146 R, 54, 146 H, 146 HE, 154, 134, 135, 129.1–129.4, 64, 71, 14–22, 53, 63, 226; 119/71, 51.5, 51.11; 366/145, 153, 160, 601, 603; 194/2; 137/624.11

[56] References Cited

U.S. PATENT DOCUMENTS

| | | | |
|---|---|---|---|
| 3,529,749 | 9/1970 | Lehmann | 222/66 |
| 3,985,266 | 10/1976 | Wright, Jr. | 222/22 |
| 4,011,967 | 3/1977 | Halsey | 222/129.4 X |
| 4,049,161 | 9/1977 | Kohl | 194/2 X |
| 4,055,279 | 10/1977 | Lapera | 222/54 |
| 4,291,647 | 9/1981 | Legrain | 119/71 X |

Primary Examiner—Joseph J. Rolla
Assistant Examiner—Kevin P. Shaver
Attorney, Agent, or Firm—Barnes & Thornburg

[57] ABSTRACT

An automatic animal feeder has a motor driven auger for supplying milk powder from a storage hopper to a mixing vessel. The mixing vessel has outlets for the continuous supply of liquid feed mixture to animal feeding locations. An electrical pump supplies water from a storage tank in the feeder to the mixing vessel. The auger and the pump are connected to an electrical control unit for delivering powder and water to the mixing vesel simultaneously in batches, the batches being automatically timed to provide a required powder to liquid ratio according to the setting of concentration selector switches on the front panel of the feeder. The batches of powder and water are supplied to the mixing vessel together in pairs when the liquid feed mixture is below a level determined by a sensor in the mixing vesel. Calibration of the powder supply is carried out by weighing a sample batch dispensed during a fixed calibration period and setting the measured weight on a calibration dial on the front panel. A heater is provided in the storage tank for heating the water prior to supplying it to the mixing vessel. If the temperature of the water is outside a predetermined range, the supply of both water and powder is disabled.

11 Claims, 15 Drawing Figures

AUTOMATIC ANIMAL FEEDER

BACKGROUND OF THE INVENTION

This invention relates to a machine for mixing powder and a liquid in predetermined proportions. A particular application of the invention is as an animal feeder for producing a milk mixture having required characteristics for immediate consumption by, for example, veal calves.

Veal calf feeders which automatically mix and dispense a milk mixture for veal cavles are well known. One such known machine comprises a milk powder hopper coupled to an automatically activated auger arranged to dispense powder into a mixing vessel. Water is pumped to the vessel from a heated tank for measured periods of time, and the mixture of powder and water is supplied to a plurality of feeding teats by pipes attached to the base of the vessel.

A difficulty associated with the automatic supply of a liquid feed to veal calves is that the proportions of powder and water need to be relatively accurately controlled whilst at the same time allowing for changes in the physical characteristics of the powder such as its consistency and density. The actual selected proportions of powder and water can also affect the accuracy of the mixture, particularly if the liquid is supplied in relatively small batches. In known machines the method of dispensing the ingredients and the calibration procedures for the machine have not in general enabled the maintenance of the required accuracy, or else have required very frequent operator intervention.

It is therefore an object of this invention to provide an improved machine which offers a relatively high degree of accuracy in the relative proportions of liquid feed ingredients.

It is a further object of the invention to provide a machine which can provide high accuracy of ingredient proportions consistently and without excessive operator intervention.

It is yet a further object of the invention to provide a veal calf feeder with improved liquid feed temperature control.

SUMMARY OF THE INVENTION

The machine in accordance with this invention has a mixing vessel with a liquid mixture outlet, and means for supplying a liquid and powder in measured batches to the vessel as the liquid feed is drawn from the outlet, the liquid being supplied in fixed volume batches and the powder being supplied in corresponding variale batches according to a required solid to liquid concentration. The machine includes the facility for regular and straightforward calibration by dispensing a sample batch of water or powder for measurement, the measured value being fed to the machine for determining the quantities of powder dispensed in response to subsequently selected percentage concentrations.

During normal operation the machine preferably supplies a fixed volume batch of liquid and a parallel measured batch of powder to the mixing vessel whenever the level of liquid feed in the vessel falls below a sensor in the vessel. During periods of maximum demand, electronic control circuitry ensures that dispensing of each batch pair is commenced only when dispensing of the previous batch pair is complete, whichever of those previous two batches occupied the greater dispensing period.

A feature of the preferred embodiment of the invention is the inclusion of an immersion heater for maintaining the liquid at a required temperature prior to mixing and a device for inhibiting operation of the machine should the liquid temperature be outside preselected limits.

BRIEF DESCRIPTION OF THE DRAWINGS

The invention will now be described by way of example with reference to the accompanying drawings in which.

DETAILED DESCRIPTION OF A PREFERRED EMBODIMENT

Figure 1:
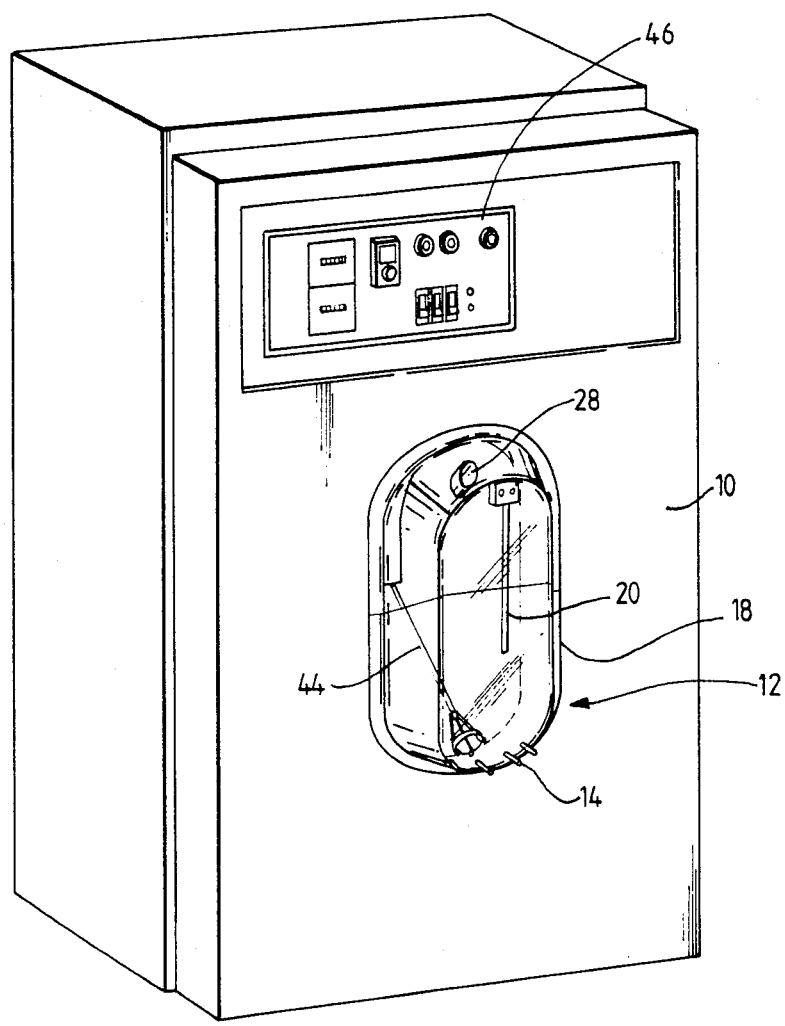
FIG. 1 is a perspective front view of the preferred embodiment of the invention.
Figure 2:
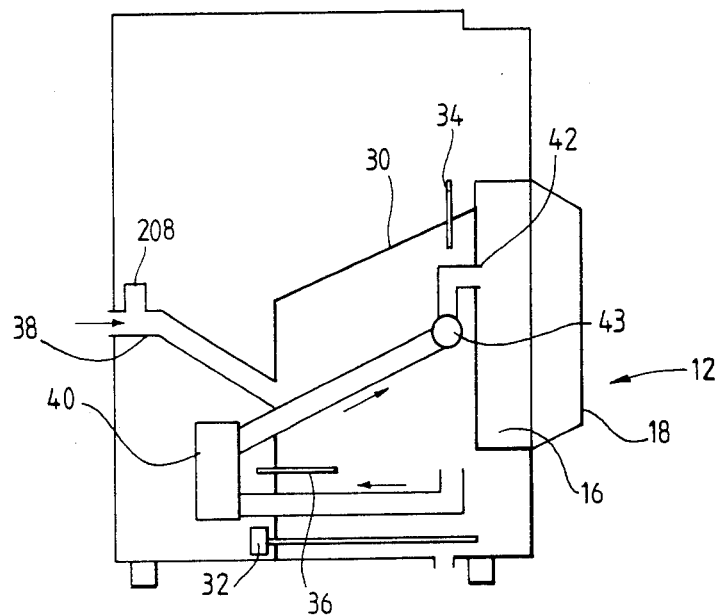
FIG. 2 is a diagrammatic sectioned side view of the machine shown in FIG. 1 showing liquid supply apparatus.
Figure 3:
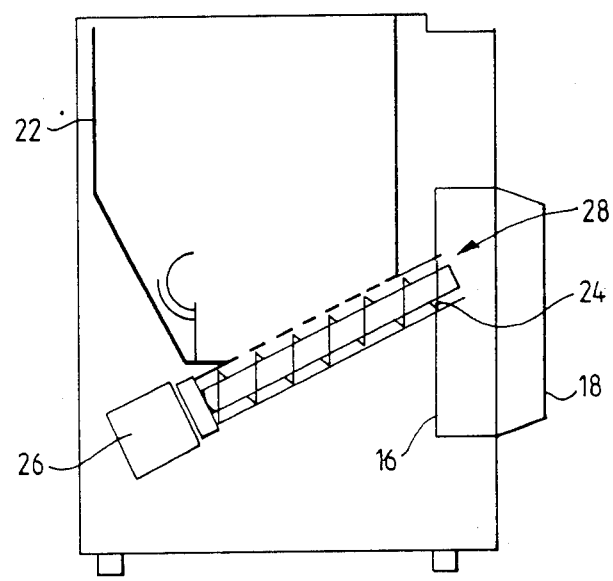
FIG. 3 is a diagrammatic sectioned side view of the machine shown in FIG. 1 showing powder supply apparatus.

The preferred embodiment of the invention is a veal calf feeder operable to mix and supply a liquid feed material to a number of feeding locations on demand. Referring to FIGS. 1, 2 and 3 the feeder machine has a front panel 10 incorporating a mixing bowl 12 with four outlets 14 for supplying liquid feed material via pipes (not shown) to feeding teats positioned at the side of an animal enclosure or pen. The mixing bowl 12 is formed by a recess 16 in the front panel 10 and a removable transparent plastics cover 18, the latter being in two halves so that the top half can be removed for calibration purposes whilst retaining liquid in the lower half.

A level sensing probe 20 is mounted in the recess 16 to detect the presence or absence of liquid at its lower end by sensing electrical conductivity. It is the movement of liquid feed material above and below the probe end that determines the automatic supply of feed ingredients to the mixing bowl 12, as will be described hereinafter.

The machine contains a hopper 22 (FIG. 3) for milk powder, and an auger 24 driven by a motor 26 for feeding powder from openings in the base of the hopper to a powder inlet 28 in the mixing bowl 12. Water and any additional liquid ingredients are held in a storage tank 30 occupying the front and lower portion of the machine with its front wall forming the rear wall of the mixing bowl recess 16. An immersion heater element 32 is provided for heating the contents of the tank 30, and, indirectly, the contents of the mixing bowl 12. Level sensing probes 34 and 36 control topping-up from a water supply inlet pipe 38.

A water pump 40 pumps water from a tank outlet to a water inlet 42 in the mixing bowl 12 via a flow control device 43.

Referring again to FIG. 1 a rotatable mixer 44 in the form of a paddle attached to a motor driven shaft projects downwardly into the lower part of the mixing bowl 12. This, and the other electrically driven devices mentioned above are all connected to electronic control circuitry which operates according to the settings on a control panel 46.

Figure 4:
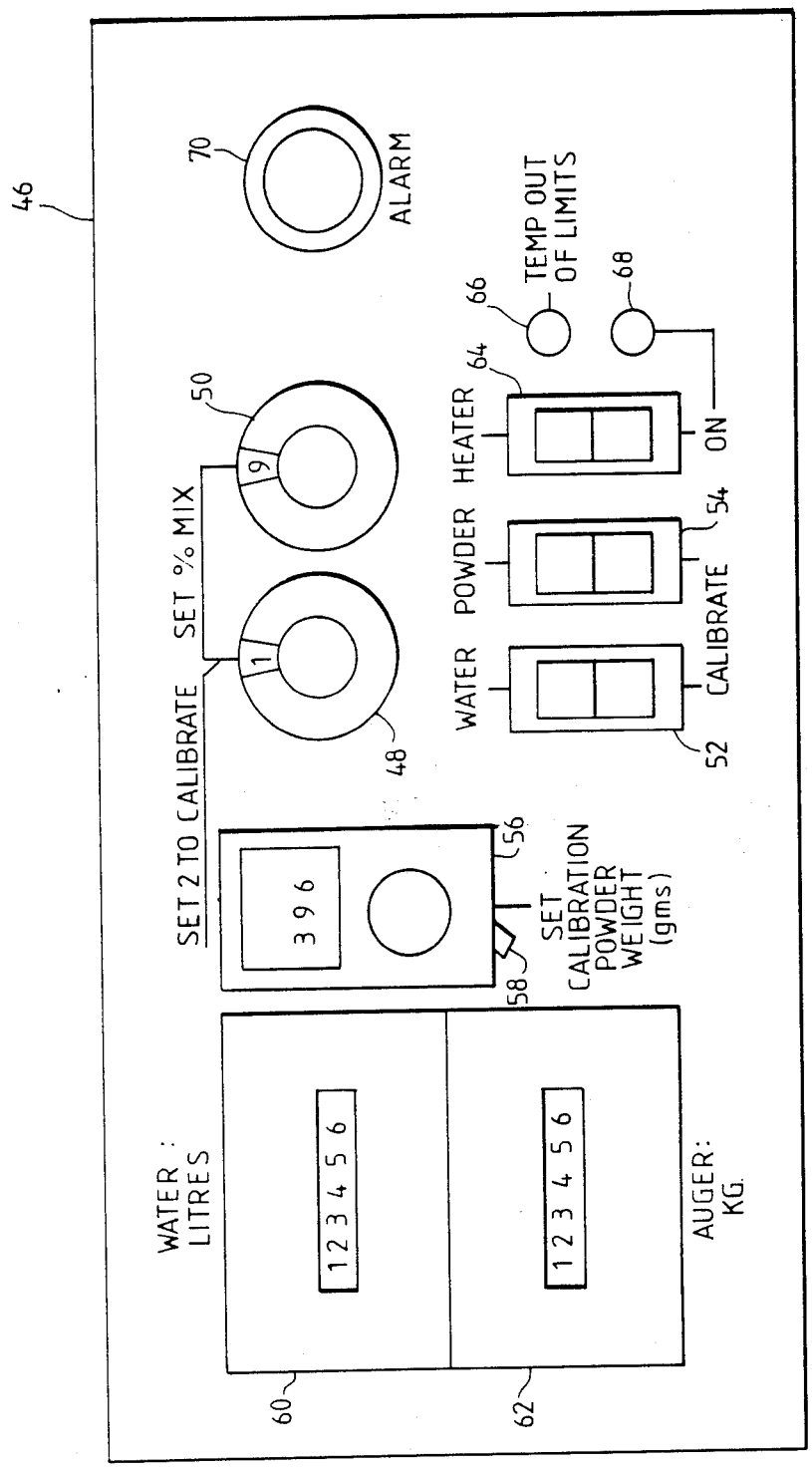
FIG. 4 is a diagram of the control panel of the machine.

The control panel 46, shown in detail in FIG. 4, includes two rotary switches 48 and 50 for setting the percentage weight by weight of milk powder relative to water up to a maximum percentage of 19%. Setting switch 48 to the number '2' puts the machine in the Calibrate mode. During calibration, batches of powder and water are dispensed separately for fixed time periods in response to operation of switches 52 and 54. The measured weight of powder dispensed is set on a ten-turn calibration potentiometer 56 which determines the amount of powder issued during normal operation for all percentage settings on switches 48 and 50. A lever 58 locks the potentiometer setting. Counters 60 and 62 record the amounts of water and powder issued. The immersion heater 36 in the water tank is controlled by a heater on/off switch 64 and a temperature sensor in the tank (not shown). If this sensor indicates that the water temperature is above or below preselected limits a warning lamp 66 is illuminated, provided the heater is switched on, as indicated by lamp 68. An alarm lamp 70 is activated if the liquid level in the mixing bowl 12 fails to reach the sensing probe 20 within a preset time.

Figure 5:
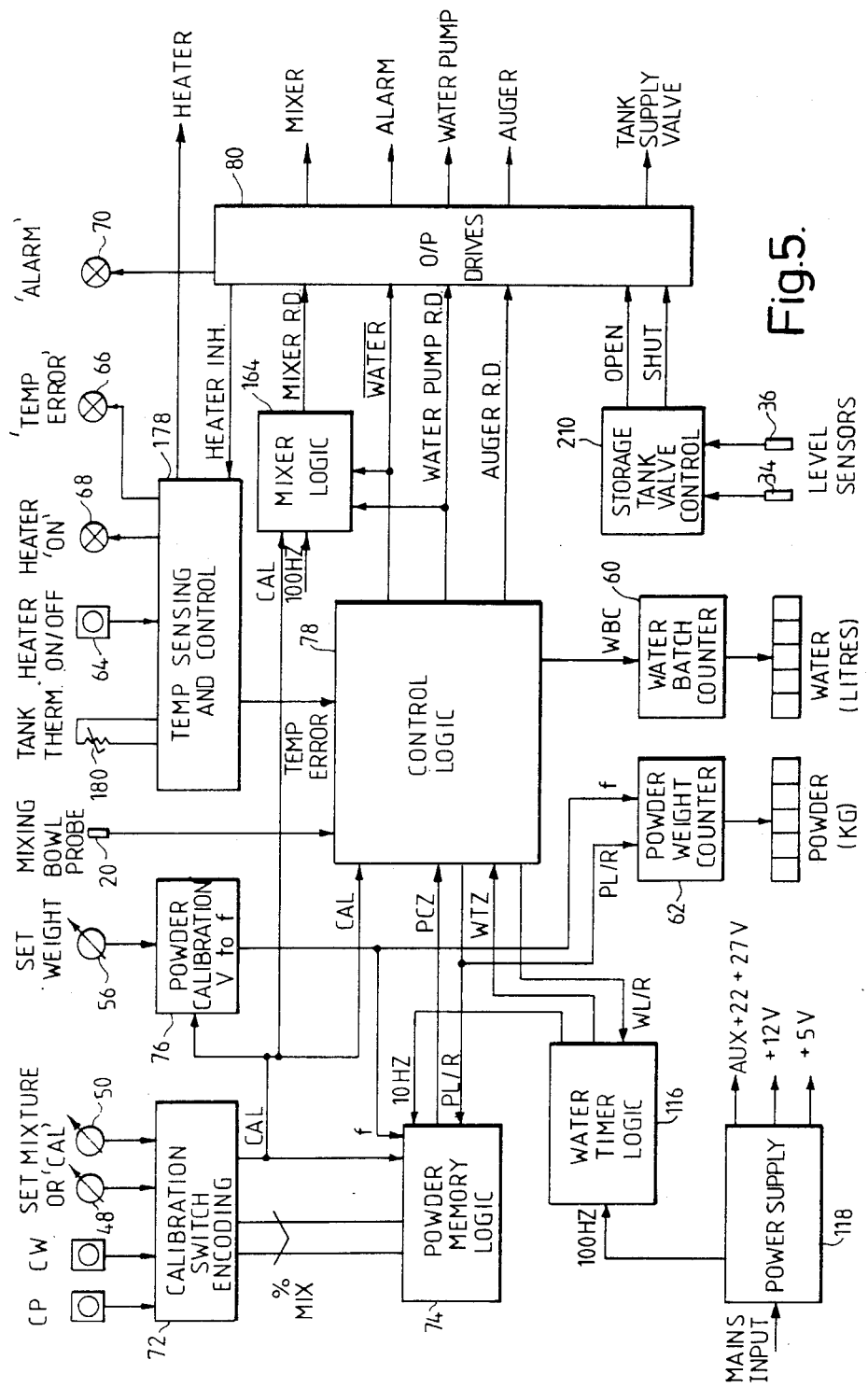
FIG. 5 is a block diagram of the electronic control circuitry of the machine.

An overall view of the control circuitry can be seen in FIG. 5.

During normal operation of the machine, the percentage control switches 48 and 50 are set to the required powder/water weight-by-weight percentage according to for example the age of the animals being fed. The maximum percentage of powder in this embodiment is 19%.

The switch settings are BCD encoded by a calibration and switch encoding circuit 72 and fed to a powder memory logic stage 74. The latter comprises a read-only memory device and a counter clocked at a clock frequency f generated by a poeder calibration circuit 76, the frequency f being porportional to a calibration weight setting of the ten-turn potentiometer 56. The read-only memory and counter in the powder memory logic stage 74 are arranged so that on receiving a LOAD/RUN command PL/R the counter counts down from a preset value determined by the percentage setting of switches 48 and 50 at a rate proportional to the calibration weight set on potentiometer 56. When the counter reaches a zero count, a POWDER COUNTER ZERO signal PCZ is issued. The command PL/R and signal PCZ are used to start and stop delivery of powder to the mixing bowl 12 by the auger 24, this being achieved via control logic circuitry 78 which drives a relay in the output drive stage 80. Thus, the longer the counter in the powder memory logic stage 74 is operating, the greater is the weight of the batch of powder issued. This time period is dependent on (a) the percentage set on the switches 48 and 50, and (b) the frequency f. The manner in which this is carried out and the setting of the frequency f during calibration will now be described in more detail with reference to FIGS. 6, 7 and 8.

Figure 6:
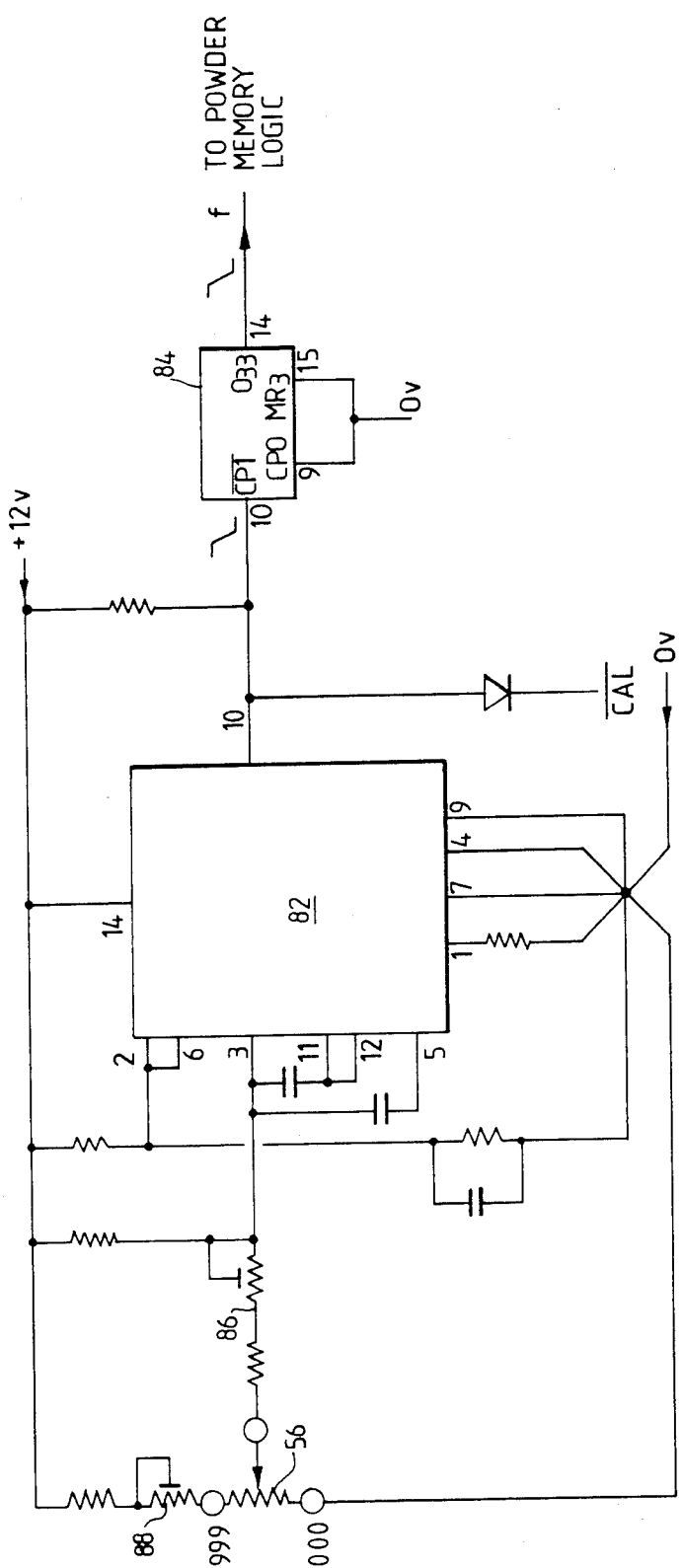
FIG. 6 is a circuit diagram of a circuit for calibrating the supply of powder.

The powder calibration circuit 76, shown in FIG. 6, comprises a voltage-to-frequency converter 82, which is an integrated circuit type 9400, coupled to the ten-turn calibration potentiometer 56. During calibration, the potentiometer 56 is adjusted to a setting equal to the weight of powder issued by the auger 24 during a fixed 20 second calibration period. The voltage fed to the V-to-f converter 82 is therefore proportional to the average rate at which the auger delivers powder during a 20 second period. An alternating signal 10f is produced at the output (pin 10) of the converter 82 and fed to a divide-by-ten circuit 84 (type 4518) to yield the clock signal of frequency f. Preset potentiometers 86 and 88 are set so that f is proportional to the potentiometer 56 setting and at a required ratio relative thereto.

Figure 7:
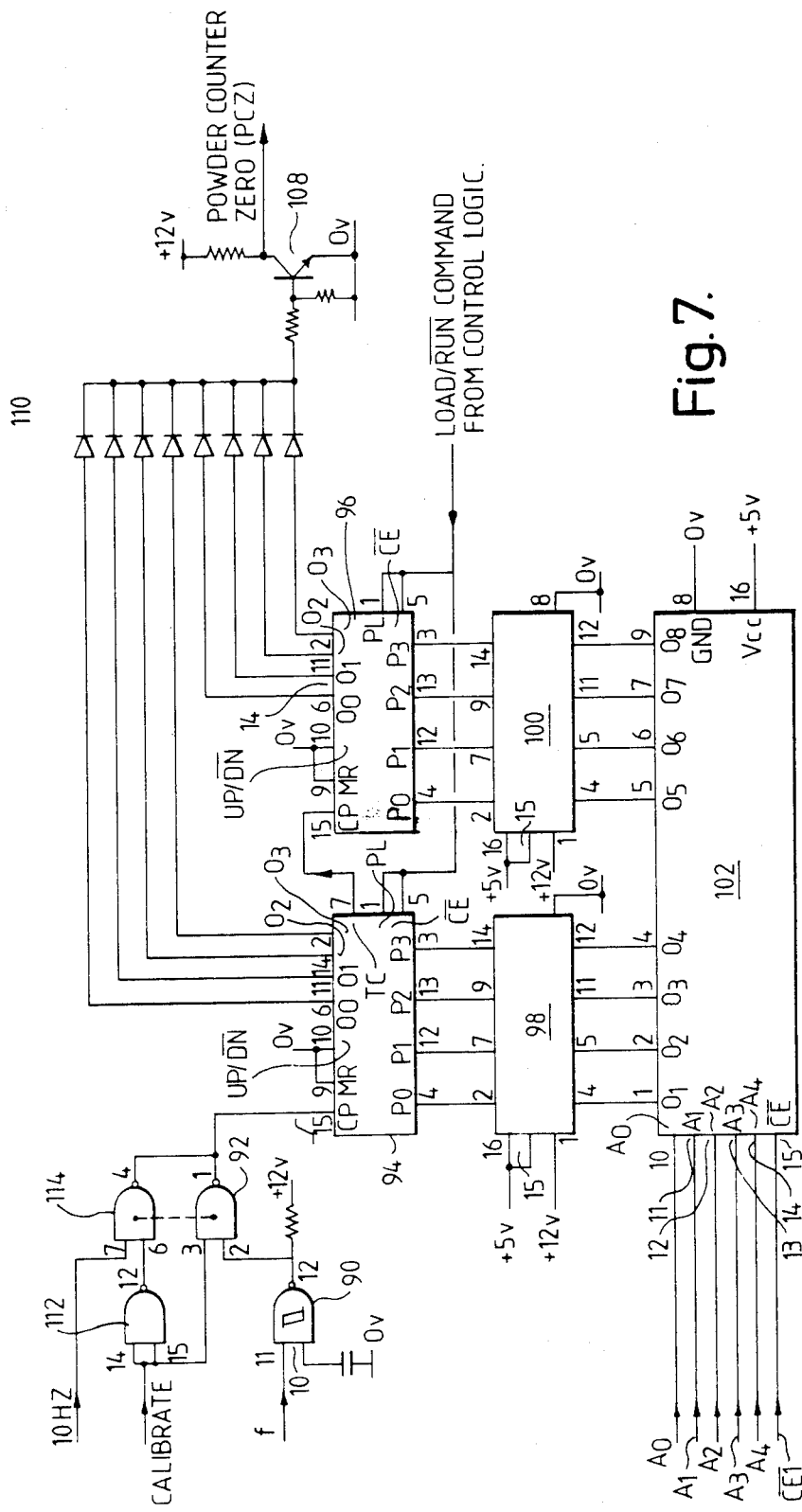
FIG. 7 is a circuit diagram of logic circuitry for controlling the amount of powder delivered.

Referring to FIG. 7, the variable clock signal f is then fed via gates 90 and 92 to a cascaded pair of counter devices 94 and 96 (type 4516). These are preset via level shift devices 98 and 100 (type 4104B) by the outputs $0_1$ to $0_8$ of the read-only memory (ROM 102 (a 32×8 bit ROM type DM 745288).

Figure 8:
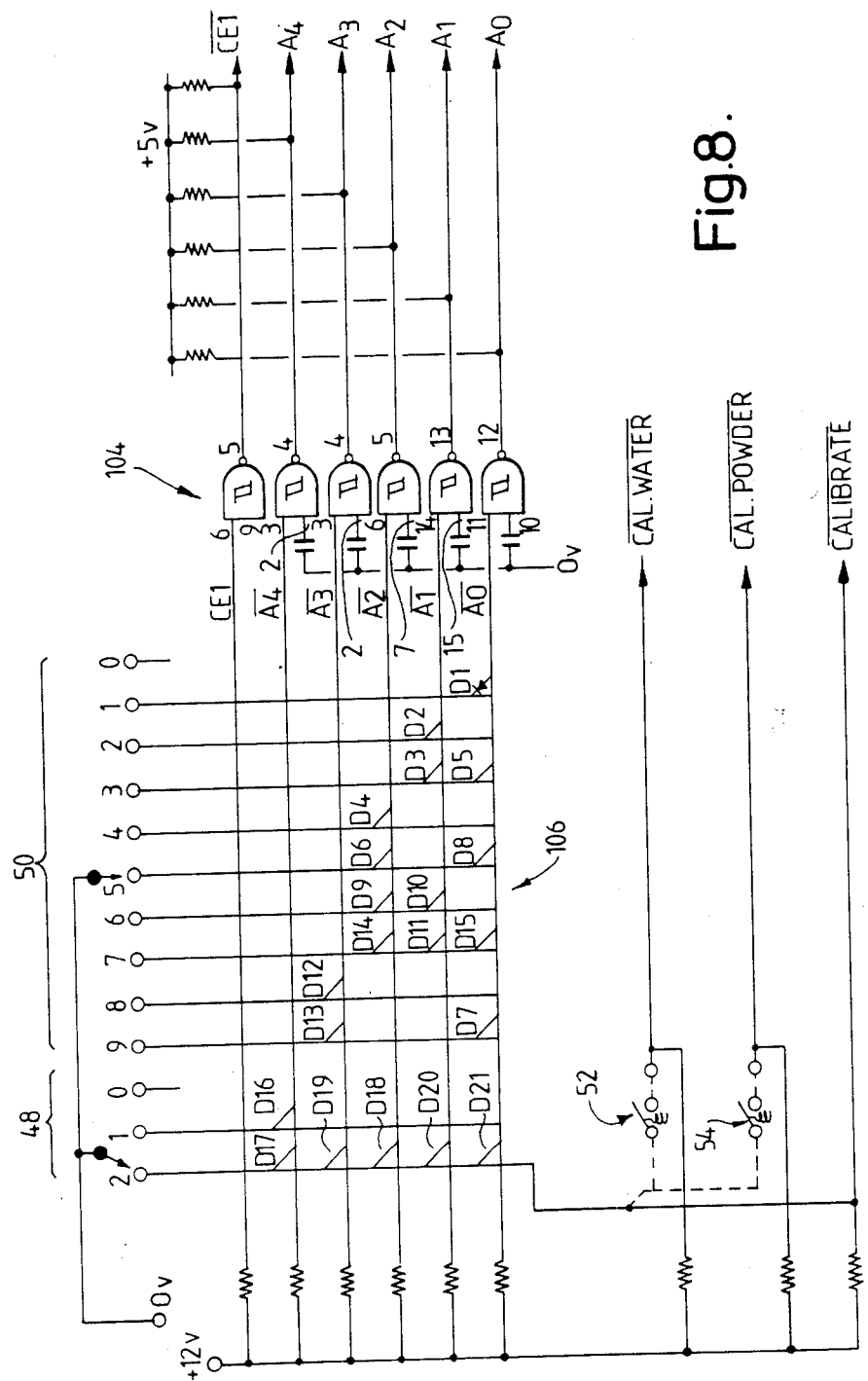
FIG. 8 is a circuit diagram of a switch encoding stage.

The ROM address lines $A_0$ to $A_4$ are driven by an array 104 of high-noise-immunity buffers (type 368) from a diode matrix 106, as seen in FIG. 8. The diode matrix 106 is coupled to the percentage setting switches 48 and 50 to encode the percentage setting into BCD for the ROM 102.

The ROM 102 is pre-programmed according to the powder delivery characteristics of the auger 24 and the relationship between the frequency f and the calibration weight set on the calibration potentiometer 56, so that the counters 94 and 96 are set to the correct initial count on receipt of the LOAD/$\overline{\text{RUN}}$ command (see FIG. 7) from the control logic circuitry 78. The counters then count down to zero at a rate which is high or low depending on whether the auger delivery rate was respectively high or low during calibration. Thus a high auger delivery rate is counteracted by a relatively short counting period.

When the counter outputs have reached zero, a transistor switch 108 is turned OFF via diodes 110 which means that the POWDER COUNTER ZERO output PCZ goes HIGH.

During calibration, the auger is driven from the counters 94 and 96 via the control logic circuitry 78 using the same LOAD/$\overline{\text{RUN}}$ and PCZ signals, except that the variable clock signal is replaced by a 10 Hz calibration clock signal. Switching of the clock signal is carried out by gates 90, 92, 112 and 114 (FIG. 7) in response to a $\overline{\text{CALIBRATE}}$ signal generated when the switch 48 (FIG. 8) is set to position '2'.

As has been described above powder is delivered to the mixing bowl 12 in variable weight batches. In contrast, water is delivered in fixed volume batches, in as much as the pump 40 is operated for fixed time periods of 10 seconds. Referring to the block diagram of FIG. 5, the pump 40 is driven via a relay in the output drive stage 80 by a water pump relay drive signal from the control logic circuitry 78. The fixed water delivery time period is determined by a water timer logic circuit 116 which issues a WATER TIMER ZERO signal WTZ 10 seconds after receiving a WATER LOAD/$\overline{\text{RUN}}$ signal WL/R from the control logic. The reference frequency signal for counting this period is obtained from the mains power supply frequency in the power supply and clock circuit 118, and in this embodiment is 100 Hz.

Figure 9:
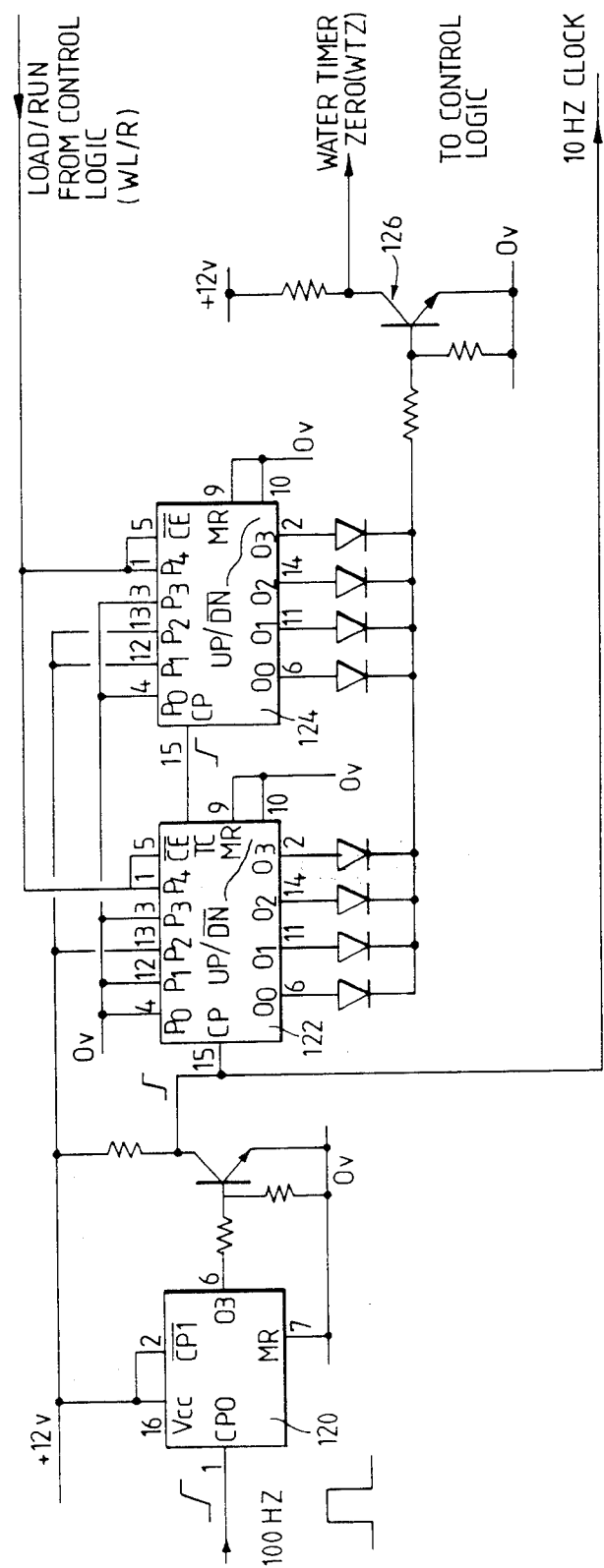
FIG. 9 is a circuit diagram of a timer for controlling delivery of liquid.

Referring to FIG. 9, the 100 Hz signal from the power supply stage 118 is fed to a divide-by-ten counter 120 (type 4518) which in turn drives a counter comprising devices 122 and 124 (type 4516) These are arranged to switch a transistor switch 126 so as to produce the WATER TIMER ZERO pulse WTZ ten seconds after receipt of the WATER LOAD/$\overline{\text{RUN}}$ command signal WL/R. The 10 Hz signal available at the output of the divider 120 serves as the fixed frequency clock signal for the powder counter in the powder memory logic stage 74.

The water timer operates in the same way during calibration, causing the delivery of water for 10 seconds in response to operation of the CALIBRATE WATER switch 52. During 10 seconds exactly 1 liter of water should be delivered, the flow control device 43 (FIG. 1) being adjusted to set that amount.

Figure 10:
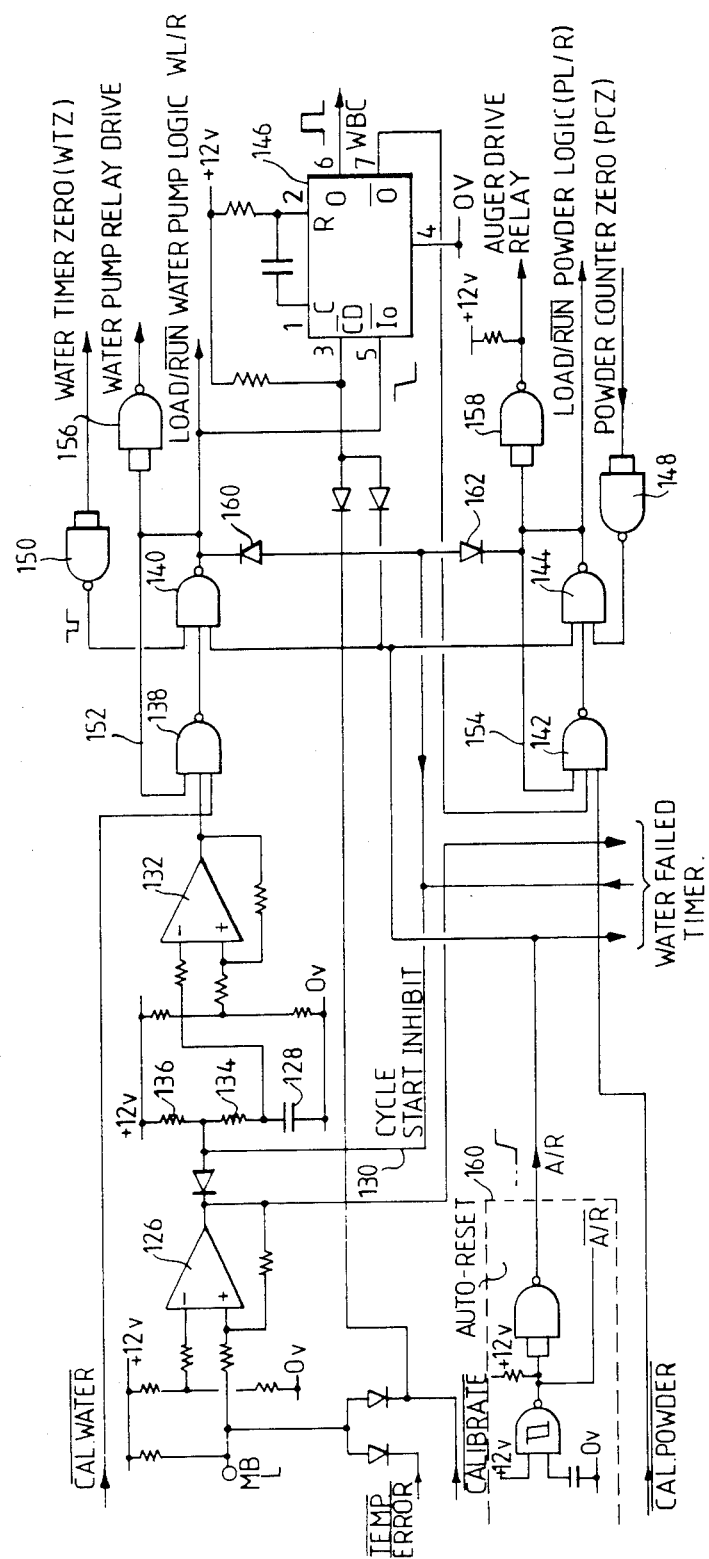
FIG. 10 is a circuit diagram of control logic circuitry.

The control logic circuitry 78 is shown in detail in FIG. 10. The primary function of the control logic is to initiate delivery of batches of powder and water according to the level of the feed mixture in the mixing bowl 12. The level sensing probe 20 in the mixing bowl 12 is connected to an input MBL (mixing bowl low) of a comparator 126 whose output is logic '1' when the level of liquid is below the end of the probe 20. Thus, when the feed mixture level drops below the probe end, capacitor 128 is allowed to charge provided that the CYCLE START INHIBIT line 130 is not grounded. After a short delay, a second comparator 132 is switched so that its output goes to logic '0'. The purpose of the delay, determined by capacitor 128 and resistors 134 and 136 is to provide a minimum interval between successive batch pairs of powder and water.

The output of the second comparator 132 is coupled to an arrangement of four NAND gates 138, 140, 142 and 144 and a monostable 146 (type 4528). These gates receive input signals PCZ and WTZ from the powder counter and the water timer via inverters 148 and 150 so that a logic '0' pulse is applied to an input of gates 144 or 140 when either the powder counter or the water timer respectively has reached zero. Feedback connections 152 and 154 connect the outputs of gates 140 and 144 to inputs of gates 138 and 142 respectively to provide a memory function. It should also be noted that the AUTO-RESET (A/R), $\overline{\text{CAL. WATER}}$, $\overline{\text{CAL. POWDER}}$, and $\overline{\text{CALIBRATE}}$ lines are all at logic '1' during normal operation. Operation of the control logic is such that batches of water and powder are issued in pairs, each batch of a pair commencing at the same time as the other batch, and each batch pair commencing only (a) when both batches of the previous pair have been completed and (b) the mixing bowl probe indicates that the feed mixture level is low. It will be appreciated that in most situations the time taken to deliver a batch of powder will be different from the time taken to deliver the corresponding batch of water, so that under maximum demand conditions a new batch pair will not be commenced until the longer of the two batches is complete.

The normal run condition, i.e. with both the water pump and the auger running, is characterised by the POWDER LOAD/$\overline{\text{RUN}}$ and the WATER LOAD/$\overline{\text{RUN}}$ signals being at logic '0', which means that the CYCLE START INHIBIT line 130 is held low and the output of comparator 132 is high. In this condition both the powder counter (FIG. 7) and the water timer (FIG. 9) are running. If the water time reaches zero first, the WTZ input goes high and gate 140 changes state, the WL/R output going high. This stops the water pump via inverter 156 and the output drive stage 80, and sets the gate 138 in a state ready to receive a start signal from comparator 132.

When subsequently the powder counter reaches zero a similar switching sequence occurs in gates 142 and 144, and the auger is stopped via inverter 158.

Now that both the WL/R and PL/R outputs are high, the CYCLE START INHIBIT line is no longer grounded via diode 160 or diode 162, and comparator 132 is able to respond to a further low level signal MBL from the mixing bowl probe 20. On receipt of this signal, the comparator 132 output changes to logic '0' causing the WL/R output to go low thereby re-starting the water pump and re-starting the water timer. At the same time, a negative going pulse is produced at the output 0 of monostable 146 to switch 142 and 144, causing the auger and the powder counter to restart.

Figure 11:
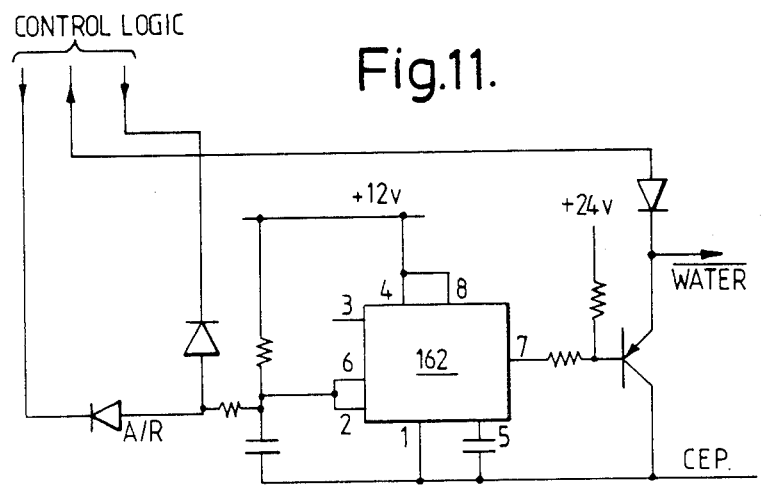
FIG. 11 is a circuit diagram of an alarm device for indicating failure of the liquid supply.

The control logic circuitry has subsidiary functions as follows. Firstly, the monostable 146 provides a pulse WBC from its second output 0 at the commencement of each water batch to increment the water batch counter 60 (FIG. 5) which in this case reads in liters. The POWDER LOAD/$\overline{\text{RUN}}$ signal also serves to drive the powder weight counter 62 which receives the variable frequency clock signal f to provide a cumulative reading in kilograms. The powder weight counter is described in more detail below with reference to FIG. 13. Secondly, the $\overline{\text{CALIBRATE}}$ and $\overline{\text{TEMP. ERROR}}$ input serve to disable the mixture level sensing circuitry during calibration or when the temperature of the water supply is outside limits. During calibration, generation of single WL/R and PL/R signals is controlled by the switches 52 and 54 via the $\overline{\text{CAL. WATER}}$ and $\overline{\text{CAL. POWDER}}$ inputs to gates 138 and 142. An auto-reset circuit 160 ensures that the control logic is correctly set when power is initially applied to the control circuitry. Finally, the output signal from comparator 136 (derived from the mixing bowl low signal MBL) is provided to a water failed timer shown in FIG. 11. Referring to FIG. 11 the water failed timer comprises a high-noise-immunity integrated circuit timer 162 (type 355) connected as a one-shot timer to generate a water failed signal $\overline{\text{WATER}}$ if the mixing bowl probe indicates a low feed mixture level for more than a predetermined time. This signal is fed to the output drive stage 80 (FIG. 5) to activate the alarm lamp 70 and to provide a volt-free ALARM output for an optional external audible alarm. The $\overline{\text{WATER}}$ signal is also fed to the CYCLE START INHIBIT line 130 (FIG. 10) to prevent further delivery of powder to the mixing bowl.

Figure 12:
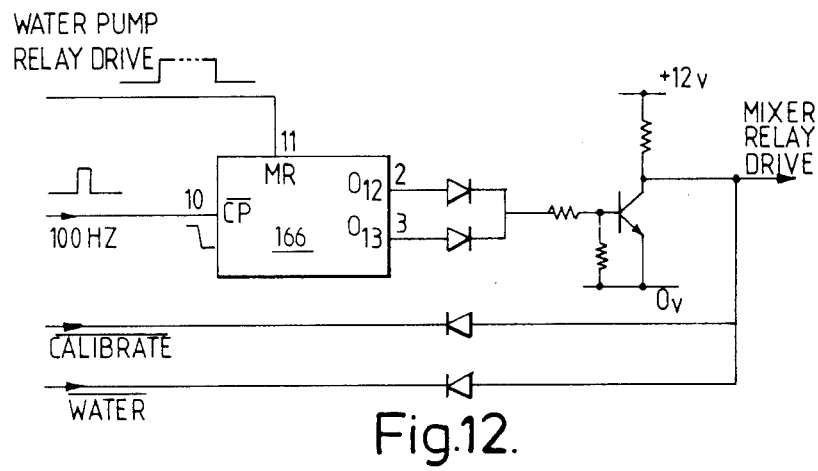
FIG. 12 is a circuit diagram of a mixer control stage.

Operation of the rotatable mixer 44 (FIG. 1) is controlled by a mixer logic circuit 164 (FIG. 5). Referring to FIG. 12, the mixer logic circuit includes a 14-stage ripple counter 166 (type 4020) which is reset whenever the water pump relay drive signal produced by the control logic circuitry goes high. The counter 166 is clocked by the 100 Hz reference generated in the power supply and clock circuit 118 and is connected to switch the mixer 44 ON for 20 seconds each time a water batch is commenced. It will be evident that in conditions of high demand the mixer will be in continuous operation.

However, when demand is relatively low and no water pump drive signals are received, the counter 166 switches the mixer ON again after an OFF interval of 140 seconds. This mixing cycle is chosen to ensure that the powder and water are thoroughly mixed as they are delivered to the mixing bowl 12, but in low demand conditions are not mixed to such an extent that there is a risk of solidification of the feed mixture. The mixer 44 is disabled by the $\overline{\text{CALIBRATE}}$ and $\overline{\text{WATER}}$ signals.

Figure 13:
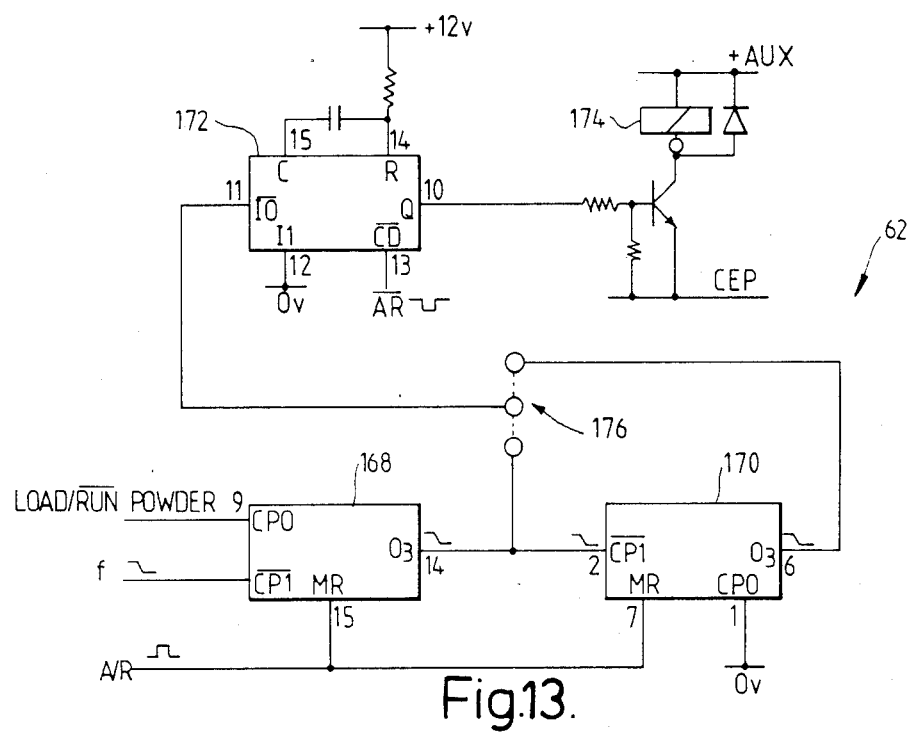
FIG. 13 is a circuit diagram of a counter for recording the weight of powder delivered.

Referring now to FIG. 13, the powder weight counter 62 comprises two divide-by-ten devices 168 and 170 (type 4518) a monostable 172 (type 4528), and a six-digit resettable counter 174. The input CP1 of divider 168 is fed from the variable frequency clock, a signal of frequency f/10 being obtained at output $0_3$ when the POWDER LOAD/RUN signal PL/R is input at input CPO. A transferable link 176 determines whether the signal fed to the monostable 172 is of frequency f/10 or f/100 and hence whether the counter 174 reads in kilograms or tenths of a kilogram.

Figure 14:
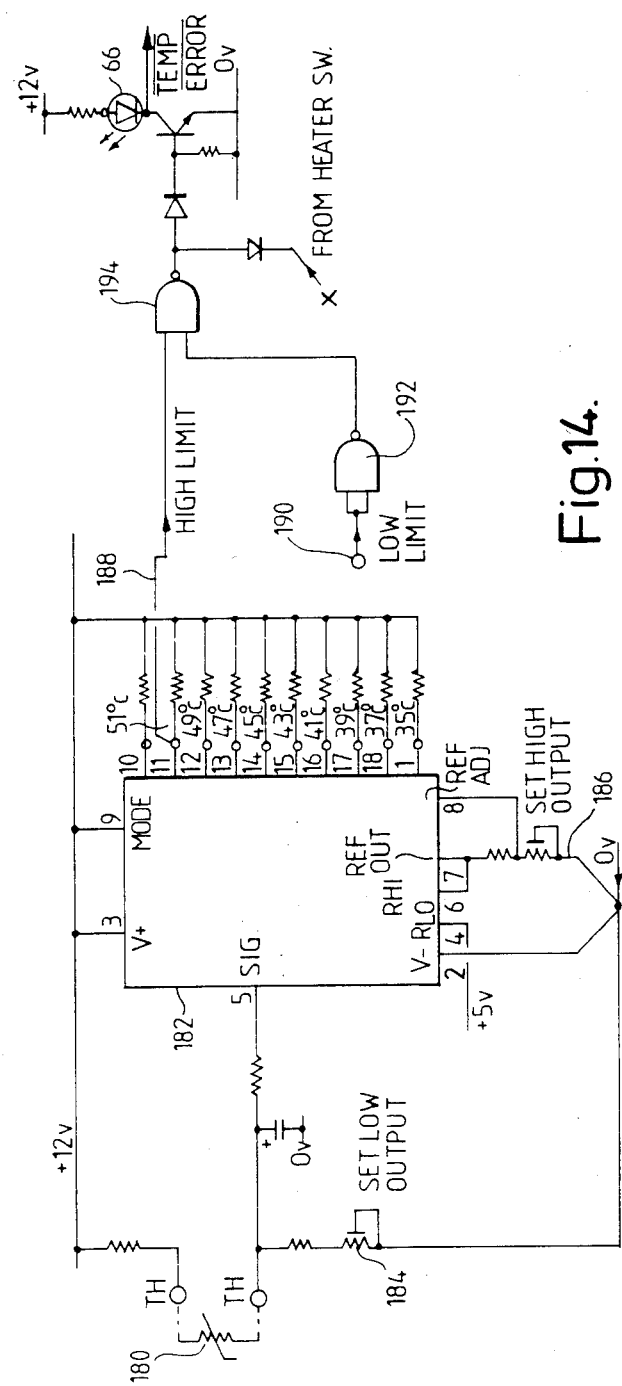
FIG. 14 is a circuit diagram of storage tank liquid temperature sensing circuitry.
Figure 15:
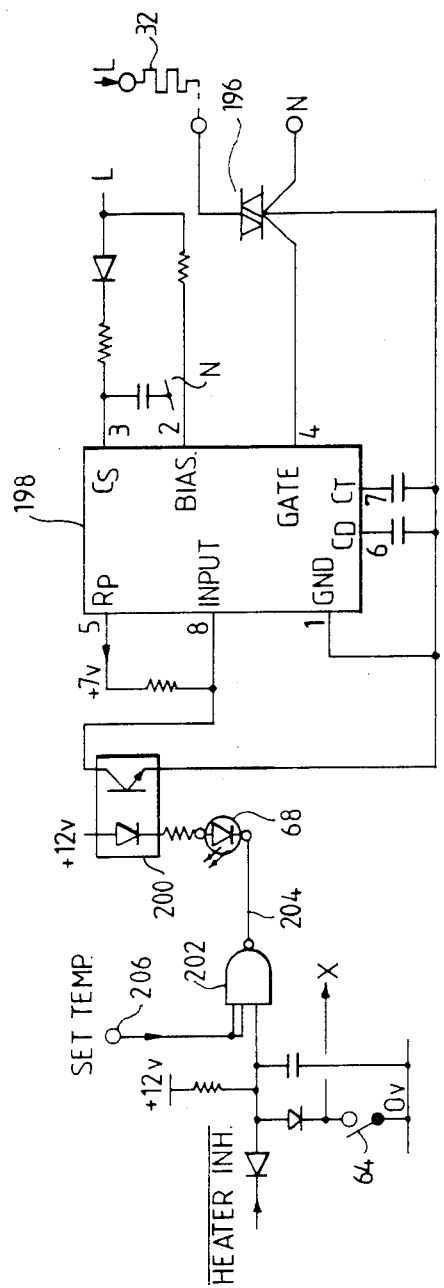
FIG. 15 is a circuit diagram of a heater switching circuit.

With reference to FIGS. 2 and 5, the immersion heater 32 in the water storage tank 30 is controlled by the temperature sensing and control circuit 178, shown in more detail in FIGS. 14 and 15. The tank 30 is fitted with a thermistor 180 (FIG. 14) acting as a water temperature sensor. The circuit 178 includes a device 182 (type LM 3914) providing a series of outputs which change state at respective temperatures within the range 35° C. to 53° C. Calibration of the outputs is performed using preset potentiometers 184 and 186. In the embodiment shown, a connection 188 is made to the 51° C. output to provide a high temperature limit, and a terminal 190 coupled to an inverter 192 is available for linking to any of the other switched outputs for a lower temperature limit. A NAND gate 194 drives the temperature out-of-limits indicator 66 and the $\overline{\text{TEMP ERROR}}$ output for inhibiting delivery of ingredients to the mixing bowl. This facility is disabled via a connection X when the heater switch 64 (FIGS. 4 and 15) is OFF. The immersion heater 32, seen in FIG. 15, is mains powered via a triac switch 196. This device, together with a zero voltage switch 198 (type 443A) powered from the mains, is isolated from the d.c. powered circuitry by an optical isolator/coupler 200. The heater switch 64, which is open in its ON position is coupled to a NAND gate 202 to force the output 204 high when closed, i.e. switch 64 closed. The same effect is produced by a $\overline{\text{HEATER INH}}$ input from the output drive stage 80 when water is supplied to the storage tank 30.

When the switch 64 is open, the state of the NAND gate output 204 is determined by the SET TEMP input 206 which is linked to one of the outputs, e.g. the 43° C. output, of the thermistor interface device 182 (FIG. 14). Thus, when the storage tank water temperature drops below 43° C., the heater 32 is switched on via coupler 200, zero-voltage switch 198 and triac 196. The heater indicator lamp 68 is an l.e.d. connected in series with the input to the coupler 200.

The $\overline{\text{HEATER INH}}$ input derived from the output drive stage 80 is activated when a supply valve 208 (see FIG. 2) driven by a relay in the output drive stage 80 is open. This relay is controlled by the storage tank valve control circuit 210 (see FIG. 5) in response to the level sensors 34 and 36 in the storage tank.

What is claimed is:

1. A machine for mixing powder and liquid to produce a liquid animal feed mixture, the machine comprising:
    a powder storage hopper;
    a liquid storage tank;
    a mixing vessel including means for mixing powder and liquid therein;
    a motor driven auger mounted beneath the powder storage hopper for delivering powder to the mixing vessel;
    a pump and a liquid supply conduit connected to the tank for delivering liquid to the mixing vessel;
    an outlet in the mixing vessel for conducting a mixture of liquid and powder away from the mixing vessel; and
    electrical control means including a mixture concentration selector for adjusting the relative proportions of powder and liquid delivered to the mixing vessel,
    said control means further including a variable period timer in the form of a presettable counter arranged to be clocked at a variable rate, a fixed period timer, said variable period timer and said fixed period timer being coupled to switching devices for energizing respectively said auger and said pump to deliver powder and liquid to the mixing vessel in batches, and a powder calibration circuit and a calibration weight input device, said calibration circuit having an output coupled to said variable period timer for feeding a clock signal to said timer, said clock signal having a frequency which is dependent on the setting of said calibration weight input device.

2. A machine according to claim 1 further comprising:
    an electrical heater mounted in said storage tank for heating liquid therein, and a temperature sensor mounted in said storage tank and responsive to the temperature of liquid therein,
    said control means including a temperature control circuit coupled to said sensor for inhibiting delivery of powder and liquid to the mixing vessel when the temperature of the liquid in said storage tank is above a predetermined value.

3. A machine for mixing powder and liquid to produce a liquid animal feed mixture, the machine comprising:
    a powder storage hopper;
    a liquid storage tank;
    a mixing vessel including means for mixing powder and liquid therein;
    a motor driven auger mounted beneath the powder storage hopper for delivering powder to the mixing vessel;
    a pump and a liquid supply conduit connected to the tank for delivering liquid to the mixing vessel;
    an outlet in the mixing vessel for conducting a mixture of liquid and powder away from the mixing vessel; and
    electrical control means including a mixture concentration selector for adjusting the relative proportions of powder and liquid delivered to the mixing vessel,
    said control means further including a variable period timer in the form of a presettable counter arranged to be clocked at a variable rate, and a fixed period timer, said variable period timer and said fixed period timer being coupled to switching devices for energizing respectively said auger and said pump to deliver powder and liquid to the mixing vessel in batches, said variable period timer including programmable read only memory means coupled to said concentration selector for presetting said presettable counter in response to the setting on said concentration selector.

4. A machine according to claim 3 further comprising:
an electrical heater mounted to said storage tank for heating liquid therein, and a temperature sensor mounted in said storage tank and responsive to the temperature of liquid therein,
said control means including a temperature control circuit coupled to said sensor for inhibiting delivery of powder and liquid to the mixing vessel when the temperature of the liquid in said storage tank is above a predetermined value.

5. A machine for mixing power and liquid to produce a liquid animal feed mixture, the machine comprising:
a powder storage hopper;
a liquid storage tank;
a mixing vessel including means for mixing powder and liquid therein;
a motor driven auger mounted beneath the powder storage hopper for delivering powder to the mixing vessel;
a pump and a liquid supply conduit connected to the tank for delivering liquid to the mixing vessel;
an outlet in the mixing vessel for conducting a mixture of liquid and powder away from the mixing vessel; and
electrical control means including a mixture concentration selector for adjusting the relative proportions of powder and liquid delivered to the mixing vessel,
said control means further including a variable period timer in the form of a presettable counter arranged to be clocked at a variable rate, and a fixed period timer, said variable period timer and said fixed period timer being coupled to switching devices for energizing respectively said auger and said pump to deliver powder and liquid to the mixing vessel in batches, said mixing vessel having a powder inlet for delivery of said powder to the mixing vessel and the mixing vessel having a front panel formed by a transparent plastic cover which encloses said mixing vessel and said powder inlet, said cover having a lower half and an upper half and said upper half being removable from the machine to expose the powder inlet to enable batches of powder delivered by the auger to be weighed for calibration of said variable period timer.

6. A machine according to claim 5, wherein the control means further includes a powder calibration circuit and a calibration weight input device, said calibration circuit having an output coupled to said variable period timer for feeding a clock signal to said timer, said clock signal having a frequency which is dependent on the setting of said calibration weight input device.

7. A machine according to claim 5 further comprising:
an electrical heater mounted in said storage tank for heating liquid therein, and a temperature sensor mounted in said storage tank and responsive to the temperature of liquid therein,
said control means including a temperature control circuit coupled to said sensor for inhibiting delivery of powder and liquid to the mixing vessel when the temperature of the liquid in said storage tank is above a predetermined value.

8. A machine according to claim 5 wherein said variable period timer includes programmable read only memory means coupled to said concentration selector for presetting said presettable counter in response to the setting on said concentration selector.

9. A method of mixing a liquid and a powder to produce a liquid animal feed mixture, the method comprising the steps of:
providing mixing apparatus including a mixing vessel having an agitator and an outlet for dispensing the liquid feed mixture, independently actuable first and second ingredient supply means for supplying respectively a first ingredient in the form of said powder and a second ingredient in the form of said liquid to the mixing vessel, and electrical control means including concentration selector means for actuating said first and second ingredient supply means;
manually setting a required powder to liquid concentration value with said concentration selector means;
automatically actuating said first ingredient supply means for a first period of time governed by the concentration value set on said concentration selector means thereby to supply a measured batch of said powder to the mixing vessel;
simultaneously actuating automatically said second ingredient supply means for a predetermined and fixed second period of time which is independent of said concentration value to supply a fixed batch of said liquid to the mixing vessel;
automatically repeating said actuation steps on condition that the level of liquid feed mixture in the mixing vessel is below a predetermined reference level, in which the mixing apparatus in initially calibrated by steps including: actuating said first ingredient supply means for a predetermined calibration time, measuring the amount of said first ingredient supplied during said predetermined calibration time, and setting a calibration input device according to said measured amount, said calibration input device being coupled to said control means and varying the frequency of a clock signal of the first ingredient supply means to adjust said first period of time for each respective concentration value subsequently set on said concentration selector means.

10. A method according to claim 9, wherein said first and second ingredient supply means are actuated together to supply the ingredients to the mixing vessel in successive pairs of batches, each pair comprising one concentration value dependent batch of said first ingredient and one fixed batch of said second ingredient, each batch pair being automatically initiated only on condition (a) that that the supply of both batches of the preceding batch pair has been completed, and (b) that the level of liquid feed mixture in said mixing vessel is below said reference level.

11. A method according to claim 10, wherein initiation of each batch pair is additionally conditional on the temperature of one of said ingredients being within a predetermined range.

* * * * *